(12) United States Patent
Kuriki et al.

(10) Patent No.: US 6,662,685 B2
(45) Date of Patent: Dec. 16, 2003

(54) COVER ASSEMBLY FOR MACHINE TOOL AND ASSEMBLING METHOD THEREOF

(75) Inventors: Kazuteru Kuriki, Nishikasugai-gun (JP); Toshio Ichino, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 09/771,709

(22) Filed: Jan. 30, 2001

(65) Prior Publication Data

US 2001/0011055 A1 Aug. 2, 2001

(30) Foreign Application Priority Data

Jan. 31, 2000 (JP) ........................................ 2000-021966

(51) Int. Cl.[7] ............................. F16P 1/02; G05G 25/04
(52) U.S. Cl. ........................... 74/612; 74/608; 451/451; 451/455; 409/134; 408/234; 277/645
(58) Field of Search ........................... 74/566, 608, 609, 74/612; 451/451, 453, 455, 456; 409/134, 235; 408/234, 241 G; 277/605, 645

(56) References Cited

U.S. PATENT DOCUMENTS

| | | | | |
|---|---|---|---|---|
| 3,653,164 A | * | 4/1972 | Price et al. | 451/451 |
| 3,667,318 A | * | 6/1972 | Lock | 105/140 |
| 3,710,646 A | * | 1/1973 | Bogan | 105/140 |
| 3,727,483 A | * | 4/1973 | Hanson et al. | 105/140 |
| 4,052,824 A | * | 10/1977 | Hutchins | 451/357 |
| 4,170,365 A | * | 10/1979 | Haaland | 277/604 |
| 4,373,406 A | * | 2/1983 | Piotrowski | 198/346 |
| 4,381,115 A | * | 4/1983 | Ko | 277/641 |
| 4,597,698 A | * | 7/1986 | Liebetrau | 160/352 |
| 4,755,244 A | * | 7/1988 | Allison | 156/158 |
| 4,926,957 A | * | 5/1990 | Urakami | 114/222 |
| 4,993,199 A | * | 2/1991 | Hughes | 134/104.4 |
| 5,658,105 A | * | 8/1997 | Takahashi | 409/134 |
| 5,667,430 A | * | 9/1997 | McPhee et al. | 451/102 |
| 5,971,839 A | * | 10/1999 | Schmelzer | 451/451 |
| 6,116,616 A | * | 9/2000 | Bratten | 277/646 |
| 6,120,222 A | * | 9/2000 | Hiramoto et al. | 409/134 |
| 6,176,656 B1 | * | 1/2001 | Seong | 409/134 |
| 6,220,799 B1 | * | 4/2001 | Okutani et al. | 409/134 |
| 6,296,599 B1 | * | 10/2001 | Staiger | 409/134 |

* cited by examiner

Primary Examiner—Chong H. Kim
(74) Attorney, Agent, or Firm—Oliff & Berridge PLC

(57) ABSTRACT

A splash cover is assembled to a mount of a base. A space for holding a packing is provided between the splash cover and the mount. A packing port is provided to the accommodating space. The structure allows an operator to install or remove the packing to or from the accommodating portion inside the splash cover without interference from the splash cover. Thus, installing or removing the packing can be easily performed. In addition, because the packing is invisible from outside, the appearance of the splash cover is improved.

12 Claims, 6 Drawing Sheets

Fig.4 ( a )       Fig.4 ( b )
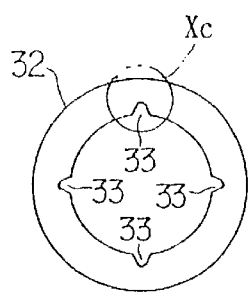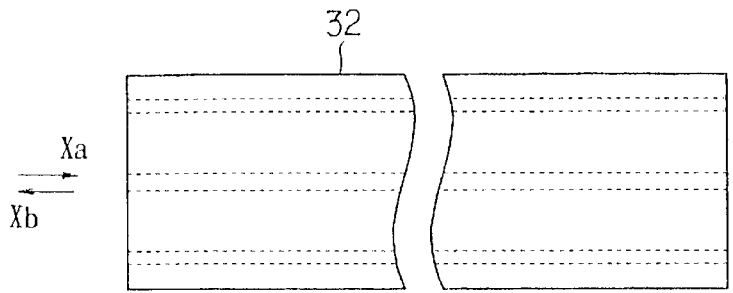
Fig.4 ( c )
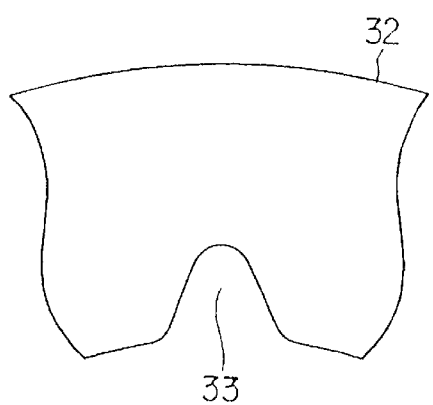

COVER ASSEMBLY FOR MACHINE TOOL AND ASSEMBLING METHOD THEREOF

BACKGROUND OF THE INVENTION

1. Field of Invention

The invention relates to a cover assembly used for a machine tool to prevent chips from flying and machining fluid from splashing outside the machine tool and also relates to an assembling method for such a cover assembly.

2. Description of Related Art

In a conventional machine tool, such as a machining center, a cover assembly is structured to enclose the machining area to prevent chips from flying and machining fluid from splashing outside the machine tool.

FIG. 6 shows an example of a conventional cover assembly. The cover assembly has a base 101. Formed at an upper portion of the base 101 is a mount 102 on which a machine tool is installed and into which a cover 103 is screwed. A peripheral wall 107 is provided vertically on a periphery of the mount 102. Accordingly, the upper portion of the base 101 is formed into a recess by the mount 102 and the peripheral wall 107. A space 104 of approximately 10 mm is formed between a peripheral plate 103a of the cover 103 and the peripheral wall 107. A packing 105 is squeezed into the space 104 from outside the cover 103 so as to prevent leakage of machining fluid or the like. The packing 105 is an elastic material, such as an urethane foam, having a thickness of approximately 15 mm. The packing 105 is compressed to a thickness of approximately 10 mm so as to be squeezed into the space 104.

The cover 103 has an extending portion 103b that extends outwardly from a mounting flange 103a to provide ample machining space. However, the extending portion 103b will cause a problem. The extending portion 103b becomes an obstacle to assembling/replacing the packing 105 and, as a result, considerable time and labor is required for mounting/dismounting the packing 105.

The base 101 and the cover 103 are 1000 mm to 1500 mm in diameter and may have a machining error of ±5 mm. Upon installation of the cover 103 having such a machining error on the base 101 also having such an error, variations in the amount of the space 104 may result. When the amount of space 104 is uneven from location to location, the packing 105 cannot be squeezed into the space 104 evenly. As a result, the upper surface of the packing 105 becomes unlevel and bad in appearance.

In another conventional cover assembly, the cover 103 is structured to extend vertically without an extending portion 103b, as shown by the dash-double dot lines. In this structure, the machining space is limited. Another problem with this structure is that a cosmetic cover 108 for hiding the packing 105 needs to be attached to the cover 103 to maintain a neat appearance.

SUMMARY OF THE INVENTION

In view of the foregoing problems, the invention provides a cover assembly, for a machine tool, that allows easy mounting/dismounting of a packing and has a neat appearance. The invention also provides an assembling method for such a cover assembly.

According to one preferred embodiment of the invention, a cover assembly used for a machine tool may include a base having a mount on an upper portion thereof and a peripheral wall provided on a periphery of the mount; a splash cover to be attached to the mount of the base; and a packing that seals a gap between the splash cover and the mount of the base. The splash cover and the mount of the base define an accommodating space therebetween, and the packing is placed in the accommodating space.

In this structure, the packing can be placed in the accommodating space and can be placed in and removed from the accommodating space easily without interference from the splash cover. In addition, because the packing is invisible from outside, the appearance of the splash cover is improved.

The splash cover may include a flange at a lower end thereof and may be attached to the mount of the base at the flange. In the structure, the packing can be placed in the accommodating space defined between the flange and the mount.

The flange of the splash cover preferably extends in an inward direction of the machine tool. The structure allows the packing to be placed in and removed from the accommodating space inside the machine tool without interference from the splash cover.

The mount of the base may include a stepped-down portion lower than a flange attaching portion of the mount. The accommodating space is defined between the stepped-down portion and the flange of the splash cover. In the structure, the packing can be positioned in the accommodating space defined between the stepped-down portion and the flange.

The stepped-down portion preferably includes a protrusion that prevents the packing from projecting from the accommodating space. In this structure, the packing is prevented from projecting and can be kept in place.

The cover assembly may further include a packing holder that prevents the packing from projecting from the accommodating space. In this structure, the packing is prevented from projecting and can be kept in place.

Further, it is preferable that the splash cover is assembled to the mount by a screw and the packing holder has a notch and is assembled to the mount together with the splash cover by the screw being inserted into the notch. This facilitates the assembly of the packing holder to the mount. The screw is initially loosely screwed into the mount to assemble the splash cover to the mount, the notch of the packing holder is fitted around the screw, and then the screw is securely screwed into the mount.

The packing is preferably hollow. This makes the packing more flexible and enables it to deform elastically so as to compensate for variations in size in the accommodating space. Accordingly, the packing provides an excellent sealing ability without being affected by variations in the size of the accommodating space.

Further, a plurality of slits are preferably formed in the packing. In this case, the packing, which is, for example, circular in cross section, elastically deforms along the slits into an oval shape in a stable manner. Thus, the packing stably makes intimate contact with the target surface, and the sealing ability of the packing is enhanced.

The cover assembly according to the invention is assembled by provisionally assembling the splash cover to the mount of the base so as to provide the accommodating space between the splash cover and the mount; inserting the packing into the accommodating space; and securing the splash cover to the mount. By this assembling method, the packing can be mounted easily without the need for being forcibly squeezed into the accommodating space.

When the cover assembly includes a packing holder with a notch, it is assembled by provisionally assembling the splash cover to the mount of the base by a screw so as to provide the accommodating space between the splash cover and the mount; inserting the packing into the accommodating space; fitting the notch of the packing holder around the screw; and securing the packing holder and the splash cover to the mount by the screw. By this assembly method, the packing can be mounted easily without the need for being forcibly squeezed into the accommodating space. In addition, the packing holder can be assembled easily at the same time together with the splash cover.

BRIEF DESCRIPTION OF THE DRAWINGS

A preferred embodiment of the invention will be described in detail with reference to the following figures wherein:

FIG. 4(a) shows a packing as viewed in the direction of arrow Xa (FIG. 4(b));

FIG. 4(b) shows the packing as viewed in the direction of arrow Xb;

FIG. 4(c) is an enlarged view of portion Xc of the packing (FIG. 4(a));

DETAILED DESCRIPTION OF PREFERRED EMBODIMENTS

A first embodiment of the invention will be described with reference to FIGS. 1 to 4(c).

Figure 1:
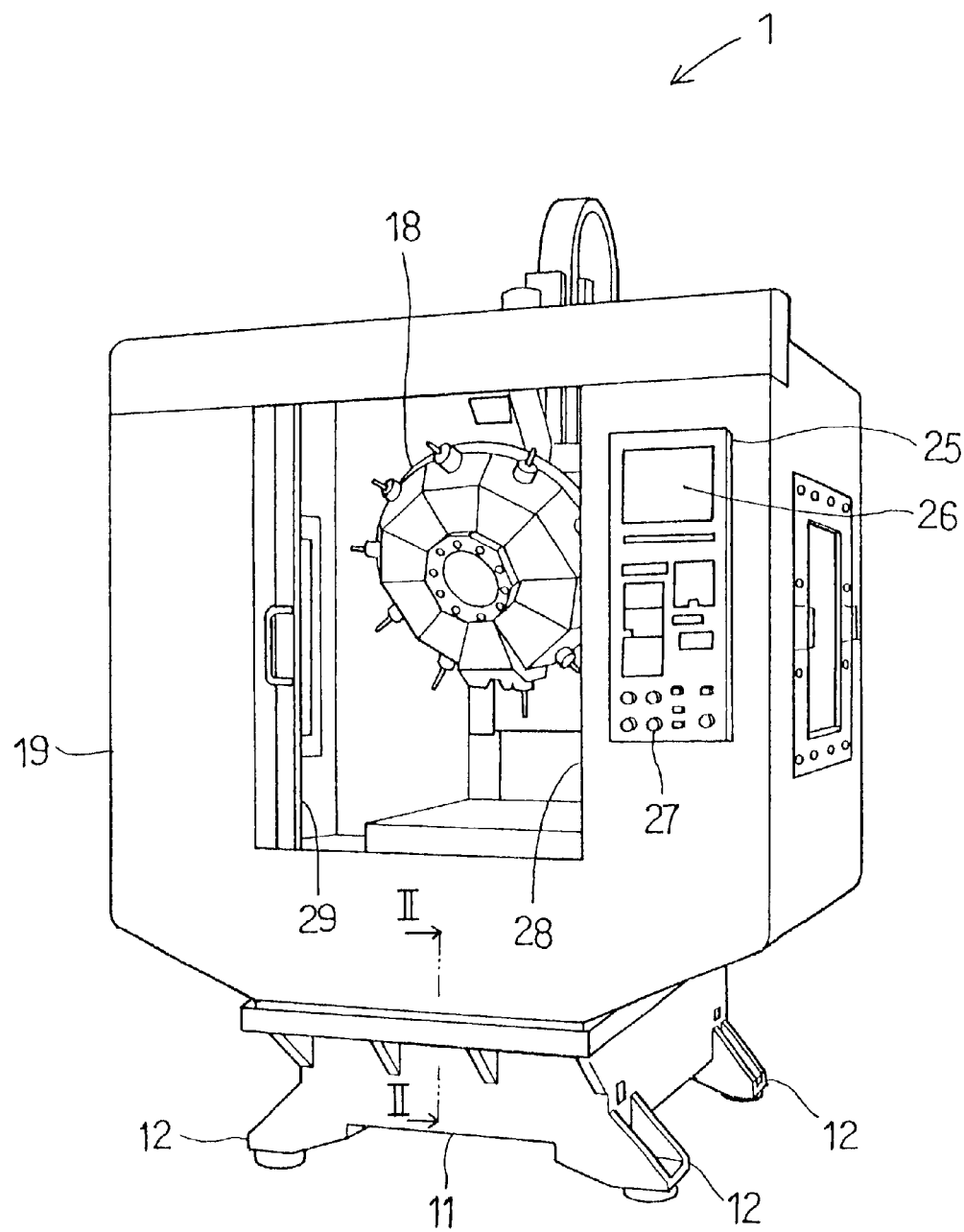
FIG. 1 is a general perspective view of a machine tool provided with a cover assembly according to the invention.

FIG. 1 is a general perspective view of a machine tool 1 provided with a cover assembly according to the invention. In FIG. 1, a base 11 is formed by poring molten metal into a mold. The base 11 has a rectangular shape when viewed from above. Legs 12 (only three legs out of four legs are shown) are formed integrally with four corners of a lower end of the base 11 and are placed on the floor of a factory or other installation site.

Figure 2:
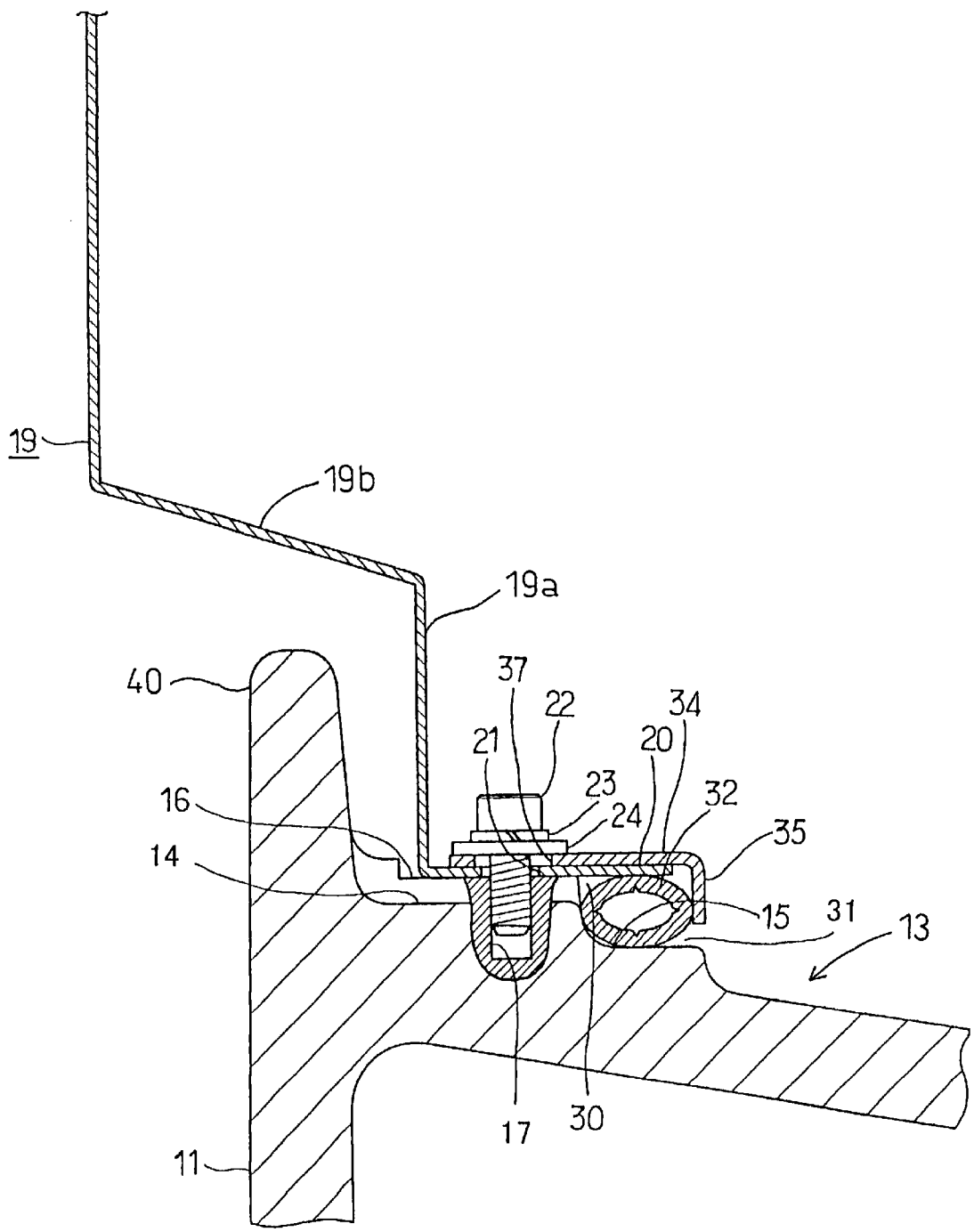
FIG. 2 is a sectional view, taken along the line II—II of FIG. 1, showing a first embodiment of the invention.

FIG. 2 is a sectional view taken along the line II—II of FIG. 1. As shown in FIG. 2, a mount 13 and a peripheral wall 40, which is provided on the periphery of the mount 13, are integrally formed with an upper end of the base 11. The mount 13 and the peripheral wall 40 are shaped like an open-topped recess. A horizontal screw seat 14 is formed on an outer periphery of the mount 13, adjacent the peripheral wall 40, and a horizontal seal seat 15 is formed on an inner periphery thereof. A plurality of ribs 16 (only one is shown) are integrally formed with the screw seat 14. A screw hole 17 (only one is shown) is drilled in the rib 16. The seal seat 15 is stepped down by a few millimeters from the screw seat 14.

A machining center (not shown) is mounted on the mount 13. The machining center is a machine tool and is mainly composed of a pallet changer (not shown) and a machining device (not shown).

The pallet changer has a cover partitioning the mount 13 into a front set-up area and a rear machining area and automatically changes between a pallet set in the machining area (not shown) and a pallet set in the set-up area (not shown). A workpiece is set in each of the pallets and, upon a changeover of the pallets, a machined workpiece is brought to the set-up area from the machining area and a workpiece to be machined is brought to the machining area from the set-up area.

The machining device machines, based on a numerical control (NC) program, a workpiece on the pallet in the machining area while horizontally moving the pallet. The machining device has a tool changing mechanism 18 (FIG. 1) that changes one tool to another and a machining fluid ejecting mechanism (not shown) that sprays machining fluid over the workpiece.

As shown in FIG. 2, a lower end of a splash cover 19 is mounted on the mount 13. The splash cover 19 is formed by assembling a plurality of steel plates and is rectangular when viewed in a transverse cross-section. The top of the splash cover 19 is closed. A horizontal flange 20 is integrally formed with the lower end of the splash cover 19. The flange 20, shaped like a square ring, is formed internally along the periphery of the splash cover 19 and is seated on the plurality of ribs 16 of the mount 13.

A plurality of through holes 21 (only one is shown) are formed in the flange 20 of the splash cover 19. Each screw 22 is inserted from above into each of the through holes 21 and screwed, at its end, into each screw hole 17 of the mount 13. The splash cover 19 is assembled to the mount 13 by clamping forces of a plurality of screws 22 so as to enclose the front, rear, right, left, and top of the machining center. A spring washer 23 and a flat washer 24 are placed around each of the screws 22.

As shown in FIG. 1, an operation panel 25 is mounted on the front right of the splash cover 19. The operation panel 25 has a display 26 showing machining information thereon and a plurality of operation keys 27 for operating the machining center. An access port 28 is provided on the front of the splash cover 19 so as to allow a worker to set/remove a workpiece on/from the pallet in the set-up area. The access port 28 is opened/closed as a door 29 is operated.

As shown in FIG. 2, a space 30 for accommodating a packing 32 is defined between the flange 20 of the splash cover 19 and the seal seat 15 of the mount 13. The accommodating space 30 is a square ring-shaped space that is open toward the machining center side, that is, open inwardly with respect to the splash cover 19.

The packing 32 is fitted into the accommodating space 30. As shown in FIGS. 4(a) and 4(b), the packing 32 is a hollow tube made of NBR (butadienachrylonitrile rubber) and is ring-shaped in cross section. Four slits 33 are formed at regular pitches (at pitches of 90 degrees) on an inner circumference of the packing 32. The packing 32 elastically deforms, along the right and left slits 33, into an oval shape and makes intimate contact with the seal seat 15 of the mount 13 and the flange 20 of the splash cover 19, thereby sealing a gap between the flange 20 and the mount 13 against leakage of machining fluid.

Figure 3:
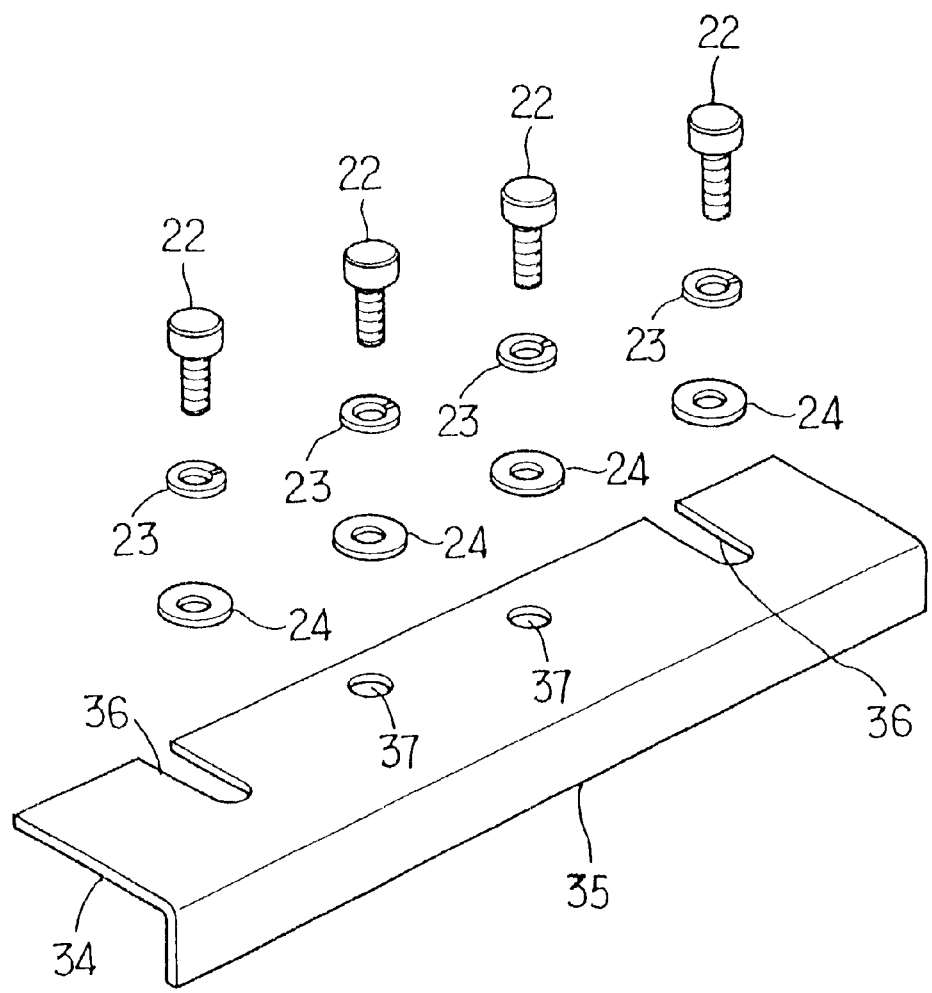
FIG. 3 is a perspective view showing a packing holder and screws.

A packing holder 34 (only one of them is shown) made of a steel plate is placed separately on the flange 20. That is, a packing holder 34 is placed on each of the four segments comprising the rectangular flange 20. Each packing holder 34 has a vertical holding portion 35, as shown in FIGS. 2 and 3.

A notch 36 is provided at either longitudinal end of the packing holder 34 and a plurality of circular through holes 37 are provided between the notches 36 at the both ends. The aforementioned screws 22 are inserted into these notches 36 and through holes 37. As shown in FIG. 2, each packing holder 34 is assembled from above to the ribs 16 of the mount 13 together with the flange 20 of the splash cover 19 by clamping forces of the screws 22. The holding portion 35 of each packing holder 34 closes the accommodating space 30 by ⅓ to ½ of its height to provide a packing port 31 as well as prevents the packing 34 from projecting from the accommodating space 30.

The procedure of assembling the cover assembly will now be described. First, the splash cover 19 is to be provisionally secured to the mount 13 by performing the following steps: putting a spring washer 23 and a flat washer 24 around each of the screws 22; placing the flange 20 of the splash cover 19 on the ribs 16 of the mount 13; inserting a screw 22 from above into each of the through holes 21 provided at both ends of each side of the flange 20 (the through holes 21 are aligned with the notches 36 of each packing holder 34 that is assembled later); and screwing the screws 22 into their respective screw holes 17 in the mount 13 so as to provide the accommodating space 30 and to leave a clearance equivalent to a plate thickness of the packing holder 34 between the flat washers 24, when the washers 23, 24 are against the head of the screw 22, and the flange 20.

After the splash cover 19 is provisionally secured to the mount 13, each of the four packing holders 34 are to be provisionally secured between the flat washers 24 and the flange 20 by performing the following steps. The packing 32 is inserted, through the packing port 31, into the accommodating space 30 followed by the insertion of a packing holder 34 onto each segment of the flange 20, between the flat washers 24 and the flange 20 of the splash cover 19 by fitting the screws 22 into the notches 36 provided at both ends of each packing holder 34.

After the four packing holders 34 are provisionally secured, the following steps are to be performed. A screw 22 is inserted into each of the remaining through holes 21 of the splash cover 19 via each of the associated through holes in each packing holder 34. Then, the screws 22 between the ends of each packing holder 34 and the remaining screws 22 are screwed into their respective screw holes 17 to secure each packing holder 34 to the splash cover 17 and to the ribs 16 of the mount 13.

According to the above-described first embodiment, the accommodating space 30 is provided between the mount 13 and the flange 20 of the splash cover 19, and the packing port 31 is provided for the accommodating space 30 so as to be open toward the side enclosed by the splash cover 19 of the machine tool. This allows a worker to insert or remove, inside the splash cover 19, the packing 32 into or from the accommodating space 30. Because the splash cover 19 is not an obstacle to insertion and removal of the packing 32, the work can be easily performed. In addition, because the packing 32 cannot be seen from the outside, the appearance of the splash cover 19 is improved.

Additionally, the splash guard 19 is finally assembled to the mount 13 after inserting the packing 32 into the accommodating space 30, with the splash cover 19 provisionally assembled to the mount 13. This obviates the need to forcibly push the packing 32 into the mount 30, with the splash cover assembled to the mount 13. Thus, insertion and removal of the packing 32 can be performed more easily.

Further, the packing holders 34 are assembled to the splash cover 19. The assembly prevents the packing 32 from projecting from the packing port 31 due to resiliency of the packing 32 or vibrations generated during machining.

Further, notches 36 are provided for each packing holder 34. The notches 36 facilitate mounting the packing holders 34. After fitting the notches 36 to their respective screws 22, with the screws loosely screwed into their respective screw holes 17, each packing holder 34 can be attached to the splash cover 19 by firmly screwing the screws 22 into their respective screw holes 17.

Further, because the packing 32 is hollow, flexibility of the packing 32 is increased. Accordingly, the packing 32 elastically deforms so as to compensate for variations in the size of the accommodating space 30, that is, variations in dimensions of the base 11 and the splash guard 19. Thus, the packing 32 provides excellent sealing ability without being affected by variations in the size of the accommodating space 30.

Further, because a plurality of slits 33 are formed in the packing 32, which is circular in cross section, the packing 32 elastically deforms into an oval shape in a stable manner. Thus, the packing 32 stably makes intimate contact with the flange 20 of the splash cover 19 and the seal seat 15 of the mount 13, and the sealing ability of the packing 32 is enhanced. Additionally, because the packing 32 elastically deforms so as to compensate for variations in vertical and horizontal dimensions of the accommodating space 30, the packing 32 provides excellent sealing ability without being affected by such variations.

Although, in the above-described first embodiment, the packing holders 34 are assembled to the splash cover 19, this is not limiting to the invention. Alternatively, the packing holders 34 may be removed. In this case, it is preferable to assemble the cover assembly by loosely screwing the screws 22 into their respective screw holes 17 of the mount 13 through the respective through holes 21 of the splash cover 19; inserting the packing 32 into the accommodating space 30; and sufficiently screwing the screws 22 into their respective screw holes 22 to secure the splash cover 19 to (the bottom of) the mount 13.

Figure 5:
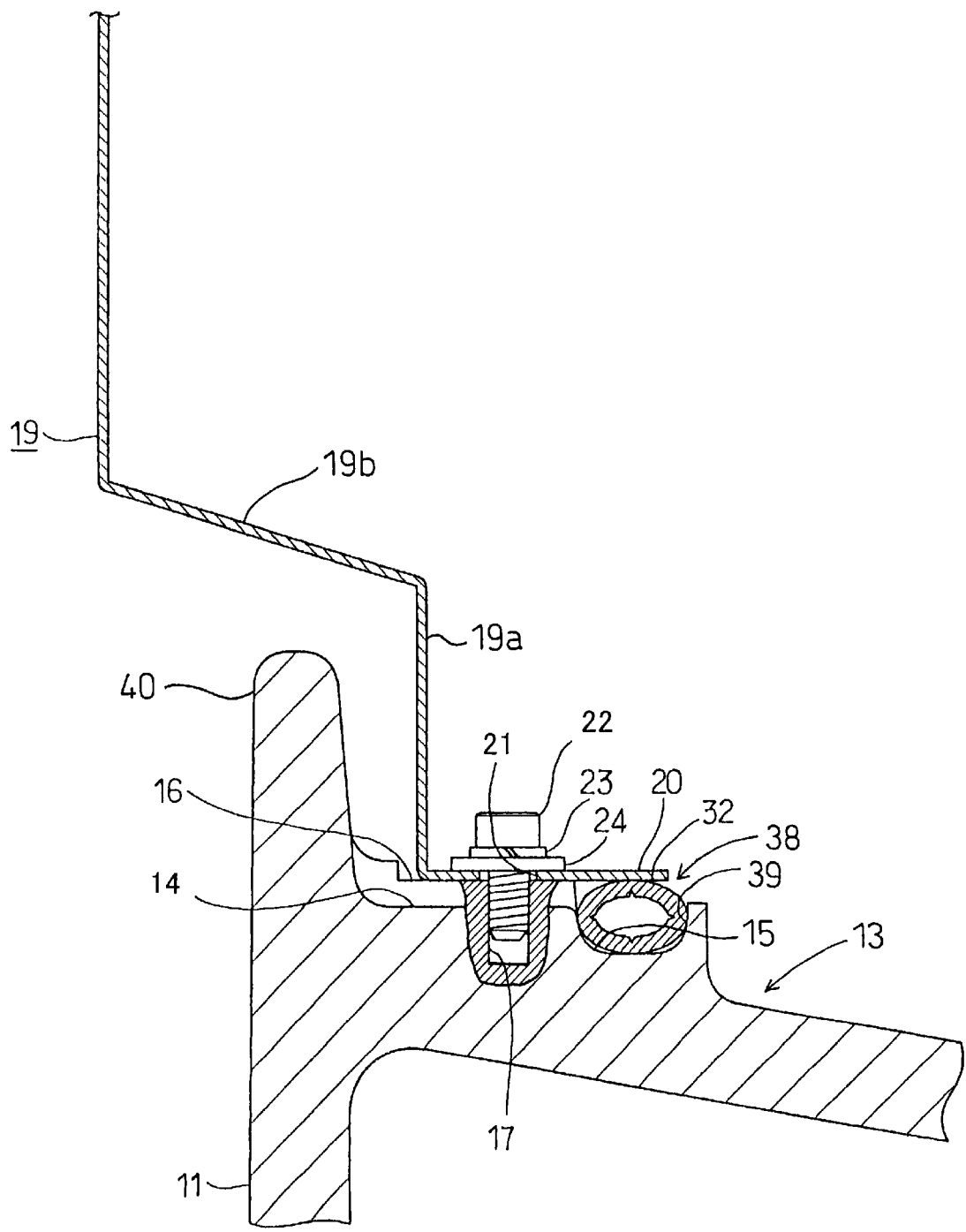
FIG. 5 is a view equivalent to FIG. 2 showing a second embodiment of the invention.
Figure 6:
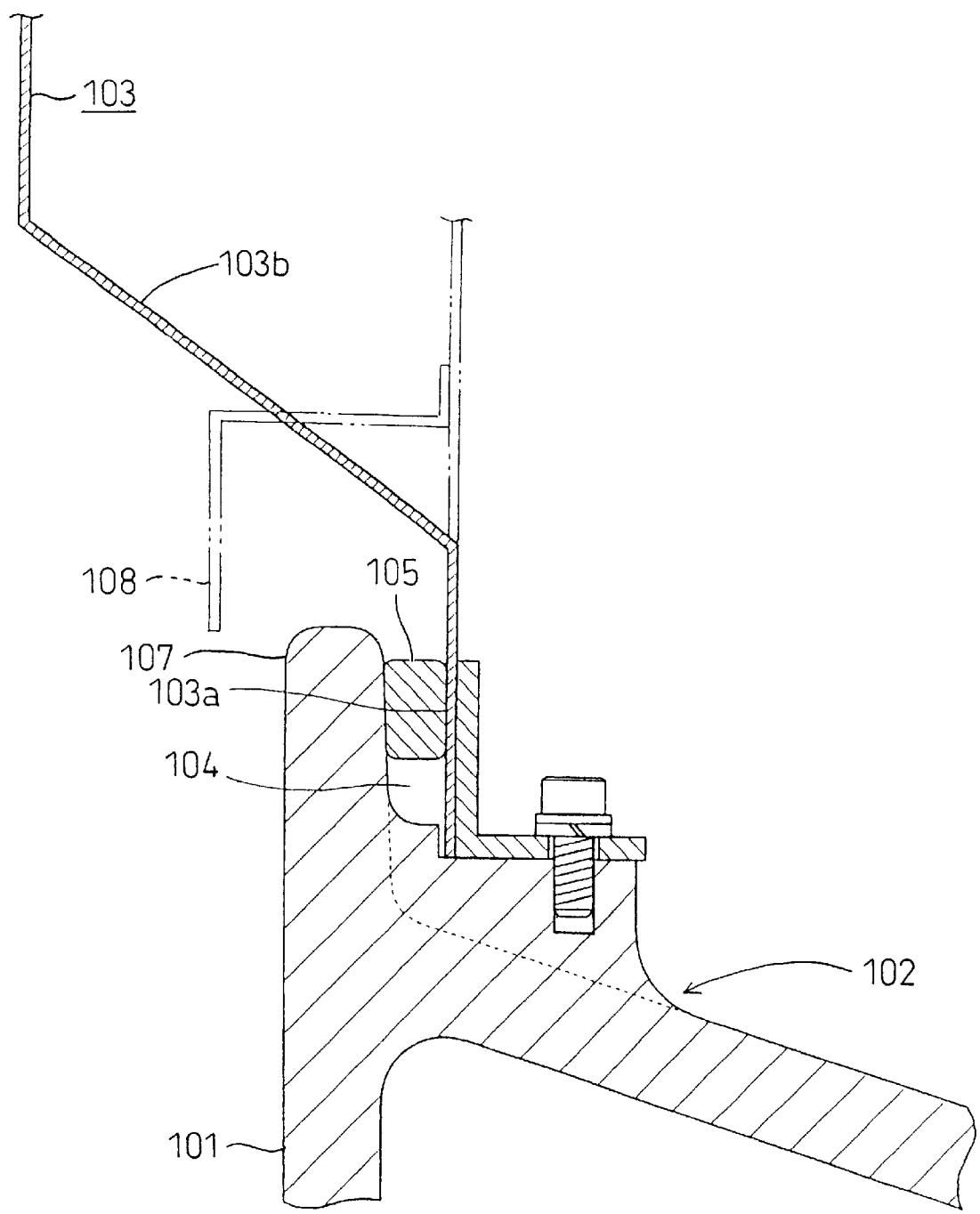
FIG. 6 is a view equivalent to FIG. 2 showing a related art cover assembly.

A second embodiment of the invention will be described with reference to FIG. 5. Similarly to the first embodiment, a seal seat 15 is formed in a mount 13 so as to be lower than the screw seat 14 by a few millimeters. Also formed in the mount 13 is a protrusion 39 that protrudes upwardly at an inner peripheral side of the seal seat 15. The seal seat 15 and the protrusion 39 form a recess 38. The recess 38, shaped like a square ring and formed peripherally around the mount 13, receives the packing 32. A flange 20 of the splash cover 19 is placed on a plurality of ribs of the mount 13. The splash cover 19 is assembled to the mount 13 by inserting a plurality of screws 22 into respective screw holes 17 via respective through holes 21 of the flange 20 and by screwing the screws 22 into the respective screw holes 17. The packing 32 elastically deforms, along the right and left slits 33, into an oval shape and makes intimate contact with a surface of the recess 38 and the flange 20 of the splash cover 19, thereby sealing a gap between the flange 20 and the mount 13 against leakage of machining fluid.

The procedure for assembling the aforementioned cover assembly will now be described. The cover assembly is assembled by placing a spring washer 23 and a flat washer 24 around each of a plurality of screws 22, inserting the packing 32 into the recess 38, placing the flange 20 of the splash cover 19 on a plurality of ribs 16 of the mount 13, inserting a screw 22 through each hole 21 in the flange 20, and screwing the screws 22 into their respective screw holes 17 in the mount 13.

According to the above-described second embodiment, the recess 38 is provided in the mount 13. With this structure, the splash cover 19 can be assembled after the packing 32 is mounted in the recess, and the packing 32 can be removed from the recess 38 after the splash cover 19 is removed. Because the splash cover 17 will not be an obstacle to installing or removing the packing 32, the work can be easily performed. In addition, because the packing 32 cannot be seen from outside, the appearance of the splash cover 19 is improved.

Further, the packing 32 is hollow. Accordingly, flexibility of the packing 32 is increased and the packing 32 provides an excellent sealing ability without being affected by variations in the size or dimensions of the recess 38. Further, as previously noted, a plurality of slits 33 are formed in the packing 32. Thus, the packing 32 provides an excellent sealing ability without being affected by variations in the vertical and horizontal dimensions of the recess 38.

While the invention has been described in connection with specific embodiments thereof, it should be understood that the invention is not limited to the above-described embodiments. Various modifications can be made without departing from the scope of the invention.

For example, although, in the above-described embodiments, the seal seat 15 is lower than the screw seat 14 by a predetermined distance in order to provide the accommodation space 30 or the recess 38 for holding the packing 32, the seal seat may be made flush with the screw seat if the flange of the cover 19 is provided with a portion bent in an upwardly slanting direction. Alternatively, the seal seat may be slanted. In addition, the seal seat of any one of these various types may be combined with the cover 19 having the above-mentioned bent portion. In a word, the flange of the cover 19 and the mount may be structured as desired provided that a space for accommodating the packing 32 is formed therebetween.

What is claimed is:

1. A cover assembly used for a machine tool, comprising:
   a base having a mount on an upper portion thereof and a peripheral wall provided a periphery of the mount;
   a splash cover removably attached directly to the mount of the base; and
   a packing that seals a gap between the splash cover and the mount of the base, wherein th splash cover and the amount of the base define an accommodating space therebetween, and the packing is placed in the accommodating space, wherein the splash cover comprises a flange at a lower end thereof and is attached to the mount of the base at the flange, and the mount of the base comprises a stepped-down portion lower than a flange attaching portion of the mount, and the accommodating space is defined between the stepped-down portion and the flange of the splash cover.

2. The cover assembly according to claim 1, wherein the flange oft e splash cover extends in an inward direction of the machine tool.

3. The cover assembly according to claim 1, wherein the stepped-down portion comprises s protrusion that prevents the packing from projecting from the accommodating space.

4. The cover assembly according to claim 1, further comprising a packing holder that prevents the packing from projection from the accommodating space.

5. The cover assembly according to claim 4, wherein the splash cover is assembled to the mount by at least one screw and the packing holder has a notch and is assembled to the mount together With the splash cover by inserting a screw into the notch.

6. The cover assembly according to 1, wherein the packing is hollow.

7. The cover assembly according to 6, wherein a plurality of slits are formed in the packing.

8. The cover assembly of claim 1, assembled by the method of:
   provisionally assembling the splash cover to the mount of the base so as to provide the accommodating space between the splash cover and the mount;
   inserting the packing into the accommodating space; and
   securing the splash cover to the mount.

9. The cover assembly of claim 5 assembled by the method of
   provisionally assembling the splash cover to the mount of the base by at least one screw a as to provide the accommodating space between the splash cover and the mount;
   inserting the packing into the accommodating space;
   fitting a notch of the packing holder around a screw of the at least one screw; and
   securing the package holder and the splash cover to the mount by the at least one screw.

10. A cover assembly, comprising:
    a base having:
    an outer peripheral wall: and
    a stepped mounting portion adjacent the outer peripheral wall and having at least a first step and a second step;
    a splash cover removably mounted via a flange directly to the base at the first step; and
    a packing removably seated on the second step between the flange and the second step, wherein the second step is lower than a flange attaching portion of the stepped mounting portion and the flange and the second step define an accommodating space for the packing;
    further comprising a protrusion extending from an edge of the second step, the edge separated from the first step, to partially enclose a space between the second step and the flange to retain the packing in position.

11. A cover assembly, comprising:
    a base having:
       an outer peripheral wall: and
       a stepped mounting portion adjacent the outer peripheral wall and having at least a first step and a second step;
       a splash cover removably mounted via a flange directly to the base at the first step; and
       a packing removably seated on the second step between the flange and the second step, wherein the second step is lower than a flange attaching portion of the stepped mounting portion and the flange and the second step define an accommodating space for the packing;
       wherein the second step contains a plurality of threaded holes and the flange of the splash cover has a plurality of matching holes, the cover assembly further comprising a plurality of holes, a bolt passing through each hole to be engaged in a threaded hole in the base.

12. The cover assembly according to claim 11, wherein each threaded hole of the plurality of threaded holes passes through a rib prior to entering the second step.

* * * * *